United States Patent [19]

Kawada et al.

[11] 4,386,278

[45] May 31, 1983

[54] WIRING HARNESS FOR MOTORCYCLES

[75] Inventors: Shigeo Kawada, Wako; Fumiyoshi Akaku, Suzaka; Seiki Yukawa, Yokkaichi, all of Japan

[73] Assignees: Honda Giken Kogyo Kabushiki Kaisha; Sumitomo Electric Industries, Ltd.; Tokai Electric Wire Company, Limited, all of Japan

[21] Appl. No.: 266,496

[22] Filed: May 22, 1981

[30] Foreign Application Priority Data

May 26, 1980 [JP] Japan .............................. 55-72168[U]

[51] Int. Cl.³ ........................ H02B 1/04; H01H 85/20
[52] U.S. Cl. ......................................... 307/9; 361/357
[58] Field of Search ................... 307/9; 361/356, 357, 361/358

[56] References Cited

U.S. PATENT DOCUMENTS 3,390,309  6/1968  McGrew ............................ 361/357
3,479,567 11/1969  Glassman .......................... 361/357
4,229,662 10/1980  Nashimoto ............................ 307/9

Primary Examiner—Donald A. Griffin
Attorney, Agent, or Firm—Irving M. Weiner; Pamela S. Burt; John L. Shortley

[57] ABSTRACT

A wiring harness for motorcycles including a junction box collectively accommodating therein a plurality of electrical circuits such as subfuses and at least one connector connecting a main cable with load circuits. The wiring harness is improved both with respect to reduction in length and reduction in the quantity of wiring materials required therefor.

6 Claims, 6 Drawing Figures

WIRING HARNESS FOR MOTORCYCLES

BACKGROUND OF THE INVENTION

1. Field of the Invention

The present invention relates generally to a wiring harness arrangement for motorcycles.

2. Description of Relevant Art

Motorcycles are generally provided with a plurality of switches on and in the vicinity of the steering portion thereof so that operations such as actuation of lights, horns and/or turn signals may be easily performed while driving. These switches are connected to respective load circuits including horns, ignition coils, and lighting loads such as headlights, taillights and flashing lights. In addition, switches provided on the brake operating lever are also connected to respective load circuits such as stoplights. Each of such load circuits is provided with a subfuse for preventing an over-current and is supplied with a source voltage from a power source, i.e., a battery, through a combination switch and a main fuse.

According to the conventional practice, the subfuses in the load circuits of such a wiring harness for motorcycles are installed individually in respective branch lines between the main fuse and the load circuits, and are provided in the vicinity of the power source which is generally mounted on a longitudinally central portion of the vehicle body. On the other hand, the combination switch functioning as a main switch and the switches for the load circuits are located on and in the vicinity of the steering portion. Thus, it has been necessary to lead wiring from the power source to the combination switch located on or in the vicinity of the steering portion through the main fuse and return it in the vicinity of the power source to distribute to the subfuses before again leading the distributed wires to the vicinity of the steering portion to have them led via the operating switches to respective loads. Therefore, wires must be extended in both directions to and from the steering portion, thus resulting in excessively lengthy and complicated wiring.

In view of such difficulties and shortcomings, there has been proposed in U.S. Pat. No. 4,229,662 (issued Oct. 21, 1980) a wiring system such as shown in FIG. 6 of the accompanying drawings, in which a wiring harness 4 from a power source 3 mounted in the longitudinally central portion of a vehicle body 2 of a motorcycle 1 is led through a main fuse 5 to the vicinity of a steering portion of the motorcycle 1. More specifically, the wiring harness 4 is led to a combination switch 6 in the front portion of the vehicle body 2 and, after being distributed, to operation switches 8 of various load circuits on a handlebar 9 through respective subfuses 7, which are collectively installed on a top bridge, for example, and through branch lines 4a.

With the wiring system described above, however, connections of branch lines 4a must be provided within a main cable 4b when it is terminated with a coupler or the like. Because of the necessary inclusion of a plurality of branch lines 4a, the main cable 4b becomes bulky and the appearance thereof is adversely affected. Moreover, the durability tends to be reduced against the bending and tensile force due to the turning movements of the handlebar, and thus it is desired that the electrical reliability be improved.

SUMMARY OF THE INVENTION

The present invention provides a wiring harness for a motorcycle including a power source disposed substantially in a central portion of a vehicle body of the motorcycle, a main cable having a main switch connected to the power source, a plurality of load circuits including subfuses and operation switches therefor, and wherein the operation switches are arranged on and in the vicinity of a steering portion of the motorcycle; wherein a junction box collectively accommodates therein a plurality of electrical circuits including the subfuses and at least one connector connecting the main cable with the load circuits. The junction box is disposed in a front portion of the vehicle body, and is preferably disposed in a space defined behind a reflector within a casing of a headlight of the motorcycle.

An object of the present invention is to provide an improved wiring harness arrangement for a motorcycle, wherein both the length and the quantity of wiring materials required is reduced, the wiring is effectively protected, and the fabrication process, maintenance operations, etc. is facilitated.

Other objects, details and advantages of the present invention will become apparent from the following detailed description, when read in conjunction with the accompanying drawings.

DETAILED DESCRIPTION OF PREFERRED EMBODIMENTS

Figure 1:
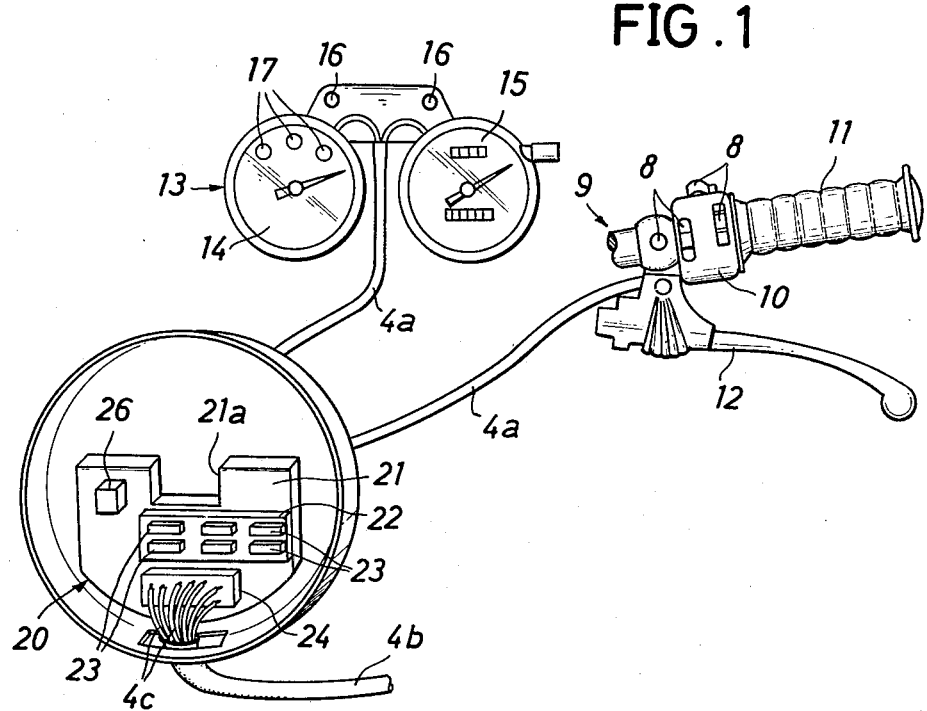
FIG. 1 is a schematic illustration of principal parts of a wiring harness in accordance with the present invention.
Figure 6:
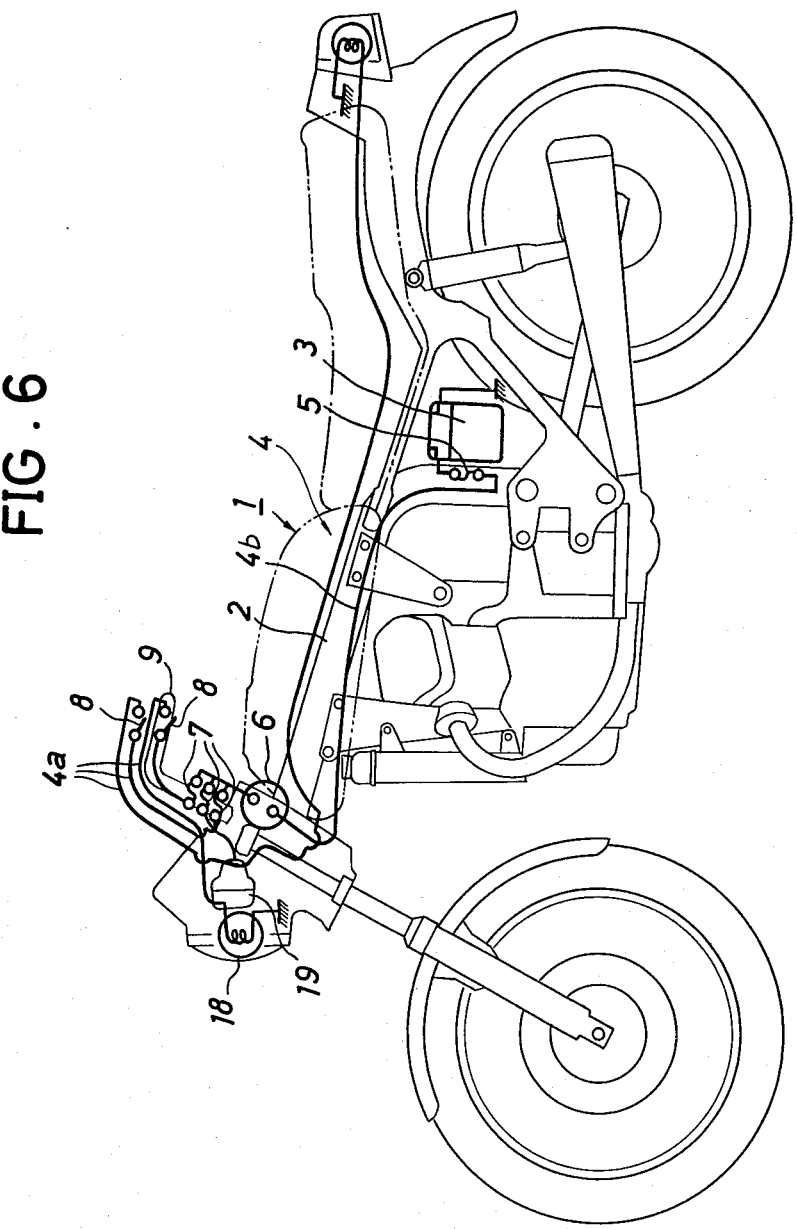
FIG. 6 is a schematic view of a conventional wiring system of a motorcycle.

With reference to FIG. 1, operation switches 8 for electrical loads such as turn signals, a headlight, and a starting circuit are installed on a boss member 10 which is mounted on either side of a handlebar 9 at the inner side of an acceleration grip 11 fitted at the distal end of the handlebar 9. A brake operating lever 12 is pivotally mounted under the boss member 10, and upon manipulation of the brake lever 12, a switch (not shown) is closed through a brake cable (not shown) so as to effect illumination of a brake lamp. A well-known type of meter unit 13 is provided with meters 14 and 15 which may comprise a tachometer and a speedometer, respectively. The meter unit 13 is supported at the center of the handlebar 9, e.g., on a top bridge, and has right and left indicators 16, 16 of turn signal lamps on the front side of the meters 14 and 15 and a number of other indicators 17 installed in the meter 14. In addition to meter unit 13, other various electrical loads are also provided. For example, as shown in FIG. 6 (although not shown in FIG. 1), there may be provided a headlight 18, right and left turn signal lamps 19, and a horn, all of which loads are distributed, some directly and the remainder indirectly via the corresponding operation switches 8, from a junction box 20 connected through a main cable 4b via a combination switch 6 to a power source 3.

Figure 3:
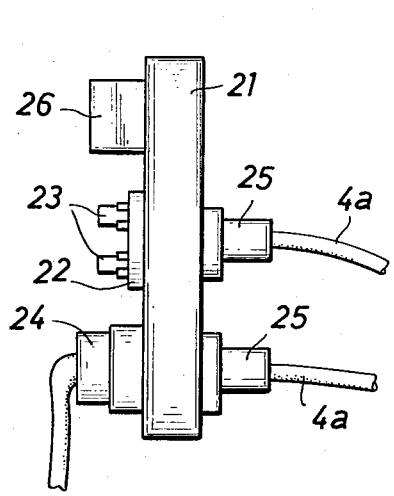
FIG. 3 depicts a side view of the junction box, with a casing removed.
Figure 2:
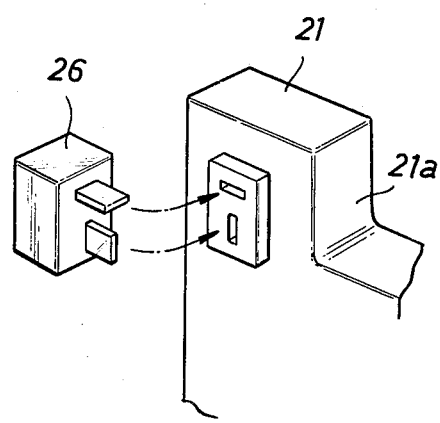
FIG. 2 is a perspective view of a principal part of a junction box in accordance with the invention.
Figure 4:
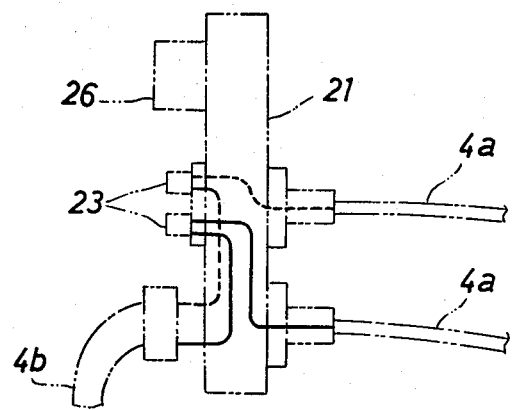
FIG. 4 is a diagrammatic illustration of wire connections.

As shown in FIG. 1, the junction box 20 comprises a substantially U-shaped base plate 21 formed of an insulating material and supporting a printed wiring board 22 which has a number of removable subfuses 23 respectively connected through so-called "bus bars" to the loads. The subfuses 23 are located between the bottom of a recess 21a, which is formed in the base plate 21 to obtain the U-shape thereof, and a removable connector 24 mounted in the lower portion of the base plate 21. The connector 24 serves as an input connector for the connection of input terminals of a plurality of branch lines 4c on the side of the main cable 4b. On the other hand, on the rear side of the base plate 21, there are detachably connected by means of respective output connectors 25 (FIG. 3) a plurality of distribution cables 4a each comprising suitable bundled branch lines leading to respective loads. The output connectors 25 have the terminals of the branch lines thereof connected through respective subfuses 23 to related terminals of the input connector 24. Various electrical elements 26 such as relays and diodes employed, for example, for the flashing of turn signal lamps, are also detachably mounted on the beam plate 21 as shown in FIG. 2 and connected to the loads by suitable branch lines through corresponding subfuses 23.

Figure 5:
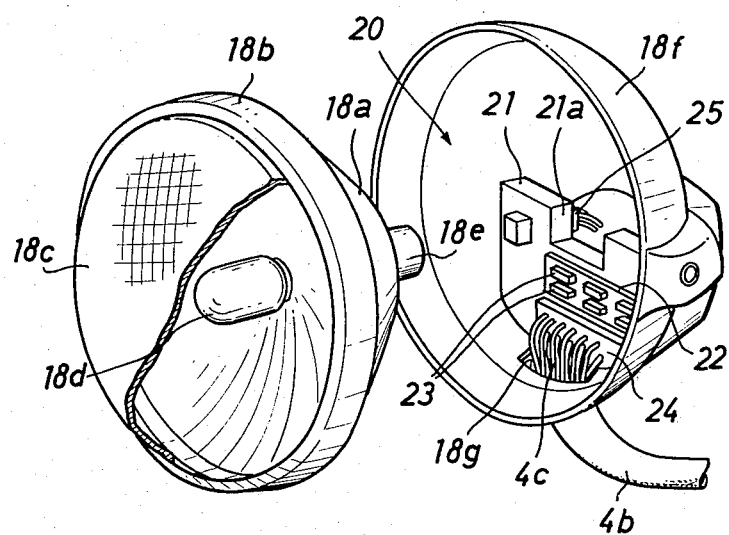
FIG. 5 illustrates a perspective view of the junction box as defined by a headlight casing.

Referring now to FIG. 5, the above-described junction box 20 is preferably disposed in a casing 18f of a headlight 18. The headlight 18 includes a conically curved reflector 18a, a frame 18b, a lens 18c covering the front side of the frame 18b, a bulb 18d, a connector 18e holding the bulb 18d, and the casing 18f detachably supporting the unit defined by frame 18b and reflector 18a. In a manner well known in the art, the connector 18e of the bulb 18d is engageable with a socket connector (not shown) provided in a rearward recess of the casing 18f.

The junction box 20 disposed in the casing 18f as described hereinabove has the base plate 21 thereof mounted at a position where it will not interfere with the lower half of the reflector 18a. Because the base plate 21 is formed with the recess 21a, the connector 18e projecting from the central rear end of the reflector 18a has the rear portion thereof loose-fitted in the recess 21a and extended into the mating connector. Therefore, the base plate 21 within the casing 18f does not interfere with the connector 18e. The input connector 24 on the front side of the base plate 21 is connected to the branch lines 4c of the main cable 4b which is led into the headlight casing 18f through an aperture 18g formed in the bottom wall of casing 18f. On the other hand, the branch lines connected to the output connectors 25 on the rear side of the base plate 21 are led out through an aperture (not shown) formed in the wall of the rearward recess of casing 18f for connection to respective switches and loads.

The above-described provision of a junction box within a headlight casing provides for economical use of the space therein and reduction of the number of component parts as compared with a junction box provided in another location. Moreover, according to the invention, the junction box may be located on or in the vicinity of a steering portion other than the headlight casing, and the base plate in the junction box is not limited to having a U-shape, and may alternatively having a ring shape or an L-shape.

As will be understood from the foregoing description, in accordance with the invention there is provided a wiring harness arrangement wherein subfuses, connectors and relays are collectively assembled in a junction box, and which is desirable in view of fabrication work and convenient maintenance in the event that a fuse blows or a relay malfunctions. Moreover, the utilization of a headlight casing as a junction box enables an effective use of space as well as a reduction in the number of component parts. Furthermore, it becomes possible to dismiss unnecessary branch lines from a main cable, thus permitting the use of a narrow cable with a sufficient flexibility for the turning of the headlight and tensile and bending forces, which thus improves electrical reliability. Still further, because distribution cables in the form of bundles of branch lines from the junction box are turnable along with the steering handlebar as well as the loads and load switches, they can be prevented from being damaged and have an improved durability. Another major advantage provided by the invention is the elimination of any need for arranging excessively long wires along the vehicle body of the motorcycle.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

We claim:

1. In a wiring harness for a motorcycle including: a power source disposed substantially at a central portion of a vehicle body of said motorcycle; a main cable having a main switch connected to said power source; a plurality of load circuits including subfuses and operation switches therefor; and wherein said operation switches are arranged on and in the vicinity of a steering portion of said motorcycle, the improvement comprising:

a junction box collectively accommodating therein a plurality of electrical circuits including said subfuses and at least one connector connecting said main cable with said load circuits; and said junction box being disposed in a space defined behind a reflector in a casing of a headlight disposed in a front portion of said vehicle body of said motorcycle.

2. A wiring harness according to claim 1, wherein: said junction box comprises a U-shaped base plate formed of an insulating material.

3. A wiring harness according to claim 2, wherein: said subfuses are arranged with respect to said U-shaped base plate on a side thereof which is proximal to said reflector.

4. A wiring harness according to claim 2 or 3, wherein:

input and output connectors are connected to said base plate on the front and rear sides thereof, respectively.

5. A wiring harness according to claim 4, wherein: said main cable extends into said casing of said headlight through an aperture formed in the bottom wall of said headlight casing.

6. A wiring harness according to claim 2 or 3, wherein:

said main cable extends into said casing of said headlight through an aperture formed in the bottom wall of said headlight casing.

* * * * *